United States Patent
Langstein et al.

(10) Patent No.: US 6,545,100 B2
(45) Date of Patent: Apr. 8, 2003

(54) HALOGENATED, HIGH MOLECULAR WEIGHT, GEL-FREE ISOBUTENE COPOLYMERS WITH ELEVATED DOUBLE BOND CONTENTS

(75) Inventors: Gerhard Langstein, Kürten (DE); Martin Bohnenpoll, Leverkusen (DE); Anthony Sumner, Köln (DE); Marc Verhelst, Schoten (BE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/013,414

(22) Filed: Dec. 10, 2001

(65) Prior Publication Data

US 2002/0107333 A1 Aug. 8, 2002

(30) Foreign Application Priority Data

Dec. 12, 2000 (EP) ............................. 00126550

(51) Int. Cl.[7] .................................. C08F 8/22
(52) U.S. Cl. .................. 525/332.8; 525/355; 525/356
(58) Field of Search ........................ 525/332.8, 355, 525/356

(56) References Cited

U.S. PATENT DOCUMENTS

| | | | |
|---|---|---|---|
| 2,356,128 A | 8/1944 | Thomas et al. ............... | 260/79 |
| 2,940,960 A | 6/1960 | Tegge et al. ................ | 260/85.3 |
| 3,029,191 A | 4/1962 | King ........................... | 167/93 |
| 3,099,644 A | 7/1963 | Parker et al. ............... | 260/85.3 |
| 4,634,741 A * | 1/1987 | Gardner et al. ............. | 525/355 |
| 5,569,723 A | 10/1996 | Baade et al. ................ | 525/357 |
| 6,015,841 A | 1/2000 | Langstein et al. ............ | 522/29 |
| 6,232,409 B1 | 5/2001 | Kaszas et al. ............... | 525/356 |

OTHER PUBLICATIONS

Ullmann's Encyclopedia of Industrial Chemistry, vol. A 23, (month unavailable) 1998, pp. 288–295, Rubber, 3, Synthetic.

W. A. Thaler & D.J. Buckley, Sr., Meeting of the Rubber Division, ACS, Cleveland, Ohio, May 6–9, 1975, published in Rubber Chemistry & Technology 49, (month unavailable) 1976, pp. 960–966.

High–Molecular–Weight, High–Unsaturation Vopolymers of Isobutylene and Conjugated Dienes. I. Synthesis.

* cited by examiner

*Primary Examiner*—Bernard Lipman
(74) *Attorney, Agent, or Firm*—Joseph C. Gil; Noland J. Cheung; Jennifer R. Seng

(57) ABSTRACT

The present invention relates to halogenated, low-gel, high molecular weight isoolefin multiolefin copolymers, in particular to halogenated, low-gel, high molecular weight butyl rubbers, and halogenated, low-gel, high molecular weight isoolefin multiolefin copolymers synthesized from isobutene, isoprene and optionally further monomers, with a multiolefin content of greater than 2.5 mol %, a molecular weight $M_w$ of greater than 240 kg/mol and a gel content of less than 1.2 wt. % and a process for their preparation.

10 Claims, 1 Drawing Sheet

US 6,545,100 B2

HALOGENATED, HIGH MOLECULAR WEIGHT, GEL-FREE ISOBUTENE COPOLYMERS WITH ELEVATED DOUBLE BOND CONTENTS

FIELD OF THE INVENTION

The present invention relates to halogenated, low-gel, high molecular weight isoolefin multiolefin copolymers, in particular to halogenated, low-gel, high molecular weight butyl rubbers, and halogenated, low-gel, high molecular weight isoolefin multiolefin copolymers synthesized from isobutene, isoprene and optionally further monomers, with a multiolefin content of greater than 2.5 mol %, a molecular weight $M_w$ of greater than 240 kg/mol and a gel content of less than 1.2 wt. % and a process for their preparation.

BACKGROUND OF THE INVENTION

Butyl rubber is a copolymer of an isoolefin and one or more conjugated multiolefins as comonomers. Commercial butyl comprises a major portion of isoolefin and a minor amount, not more than 2.5 wt %, of a conjugated multiolefin. The preferred isoolefin is isobutylene. Suitable conjugated multiolefins include isoprene, butadiene, dimethyl butadiene, piperylene, etc. of which isoprene is preferred. It is generally prepared in a slurry process using methyl chloride as a vehicle and a Friedel-Crafts catalyst as the polymerization initiator. The methyl chloride offers the advantage that $AlCl_3$ a relatively inexpensive Friedel-Crafts catalyst is soluble in it, as are the isobutylene and isoprene comonomers. Additionally, the butyl rubber polymer is insoluble in the methyl chloride and precipitates out of solution as fine particles. The polymerization is generally carried out at temperatures of about −90° C. to −100° C. See U.S. Pat. No. 2,356,128 and Ullmanns Encyclopedia of Industrial Chemistry, volume A 23,1993, pages 288–295. The low polymerization temperatures are required in order to achieve molecular weights which are sufficiently high for rubber applications.

Raising the reaction temperature or increasing the quantity of isoprene in the monomer feed results in more poor product properties, in particular, in lower molecular weights. However, a higher degree of unsaturation would be desirable for more efficient crosslinking with other, highly unsaturated diene rubbers (BR, NR or SBR).

The molecular weight depressing effect of diene comonomers may, in principle, be offset by still lower reaction temperatures. However, in this case the secondary reactions, which result in gelation occur to a greater extent. Gelation at reaction temperatures of around −120° C. and possible options for the reduction thereof have been described (c.f. W. A. Thaler, D. J. Buckley Sr., Meeting of the Rubber Division, ACS, Cleveland, Ohio, May 6–9, 1975, published in *Rubber Chemistry & Technology* 49, 960–966 (1976)). The auxiliary solvents such as $CS_2$ required for this purpose are not only difficult to handle, but must also be used at relatively high concentrations.

Furthermore, it is furthermore known to perform gel-free copolymerization of isobutene with various comonomers to yield products of a sufficiently high molecular weight for rubber applications at temperatures of around −40° C. using pretreated vanadium tetrachloride (EP-A1-818 476).

It is also possible to use this aged vanadium initiator system at relatively low temperatures and in the presence of an isoprene concentration which is higher than conventional (approx. 2 mol % in the feed), but, as with $AlCl_3$-catalyzed copolymerization at −120° C., in the presence of isoprene concentrations of >2.5 mol % this results in gelation even at temperatures of −70° C.

Halogenated butyls are well known in the art, and possess outstanding properties such as oil and ozone resistance and improved impermeability to air. Commercial halobutyl rubber is a halogenated copolymer of isobutylene and up to about 2.5 wt % of isoprene. As higher amounts of isoprene lead to gelation and/or too low molecular weight of the regular butyl being the starting material for halogenated butyl, no gel-free, halogenated butyls with comonomer contents of greater than 2.5 mol %, a molecular weight $M_w$ of greater than 240 kg/mol and a gel content of less than 1.2 wt. % are known.

SUMMARY OF THE INVENTION

One object of the present invention was to provide halogenated, low-gel, high molecular weight isoolefin multiolefin copolymers, in particular to halogenated, low-gel, high molecular weight butyl rubbers, and halogenated, low-gel, high molecular weight isoolefin multiolefin copolymers synthesized from isobutene, isoprene and optionally further monomers, with a multiolefin content of greater than 2.5 mol %, a molecular weight $M_w$ of greater than 240 kg/mol and a gel content of less than 1.2 wt. %.

Another object was to provide a process for the production of halogenated low-gel, high molecular weight isoolefin multiolefin copolymers, in particular to halogenated, low-gel, high molecular weight isoolefin diene copolymers, halogenated, low-gel, high molecular weight butyl rubbers, and halogenated, low-gel, high molecular weight isoolefin copolymers synthesized from isobutene, isoprene and optionally further monomers, with a multiolefin content of greater than 2.5 mol %, a molecular weight $M_w$ of greater than 240 kg/mol and a gel content of less than 1.2 wt. % characterized in that said halogenated copolymers are produced in a process comprising the following steps:

a) polymerizing at least one isoolefin, at least one multiolefin, preferably a diene, and optionally further monomers in presence of a catalyst and a organic nitro compound b) contacting the resulting copolymer under halogenation conditions with at least one halogenating agent.

DETAILED DESCRIPTION OF THE INVENTION

Figure 1:
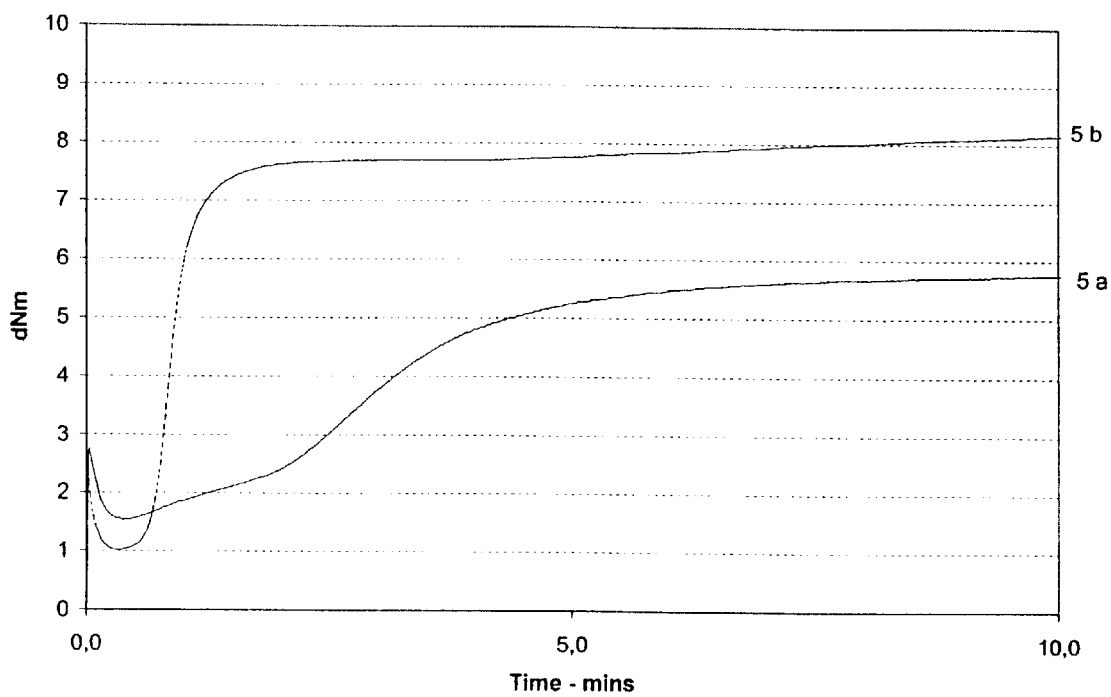
FIG. 1 is a graph which shows the improved curing properties of the compounds according to the present invention.

With respect to the monomers polymerized to yield the starting material for halogenation, the expression "isoolefin" in this invention is preferably used for isoolefins with 4 to 16 carbon atoms of which isobutene is preferred.

With respect to the use of a multiolefin, every multiolefin copolymerizable with the isoolefin known by the skilled in the art can be used. Dienes are preferably used. Isoprene is more preferably used.

As optional monomers, every monomer copolymerizable with the isoolefins and/or dienes known by the skilled in the art can be used. α-methyl styrene, α-methyl styrene, chlorostyrene, cyclopentadiene and methylcyclopentadiene are preferably used.

The multiolefin content is greater than 2.5 mol %, preferably greater than 3.5 mol %, more preferably greater than 5 mol %, and most preferably greater than 7 mol %.

The molecular weight $M_w$ is greater than 240 kg/mol, preferably greater than 300 kg/mol, more preferably greater than 350 kg/mol, and even most preferably greater than 400 kg/mol.

The gel content is less than 1.2 wt. %, preferably less than 1 wt %, more preferably less than 0.8 wt %, and even most preferably less than 0.7 wt %.

The polymerization is preferably performed in the presence of an organic nitro compound and a catalyst/initiator selected from the group consisting of vanadium compounds, zirconium halide, hafnium halides, mixtures of two or three thereof, and mixtures of one, two or three thereof with $AlCl_3$, and from $AlCl_3$ derivable catalyst systems, diethylaluminum chloride, ethylaluminum chloride, titanium tetrachloride, stannous tetrachloride, boron trifluoride, boron trichloride, or methylalumoxane.

The polymerization is preferably performed in a suitable solvent, such as chloroalkanes, in such a manner that in case of vanadium catalysis, the catalyst only comes into contact with the nitroorganic compound in the presence of the monomer.

in case of zirconium/hafnium catalysis the catalyst only comes into contact with the nitroorganic compound in the absence of the monomer.

The nitro compounds used in this process are widely known and generally available. The nitro compounds preferably used according to the present invention are disclosed in copending DE 100 42 118.0 which is incorporated by reference herein and are defined by the general formula (I)

$$R-NO_2 \qquad (I)$$

wherein R is selected from the group H, $C_1$–$C_{18}$ alkyl, $C_3$–$C_{18}$ cycloalkyl or $C_6$–$C_{24}$ cycloaryl.

$C_1$–$C_{18}$ alkyl is taken to mean any linear or branched alkyl residues with 1 to 18 C atoms known to the person skilled in the art, such as methyl, ethyl, n-propyl, i-propyl, n-butyl, i-butyl, t-butyl, n-pentyl, i-pentyl, neopentyl, hexyl and further homologues, which may themselves in turn be substituted, such as benzyl. Substituents, which may be considered in this connection, are in particular alkyl or alkoxy and cycloalkyl or aryl, such benzoyl, trimethylphenyl, ethylphenyl. Methyl, ethyl and benzyl are preferred.

$C_6$–$C_{24}$ aryl means any mono- or polycyclic aryl residues with 6 to 24 C atoms known to the person skilled in the art, such as phenyl, naphthyl, anthracenyl, phenanthracenyl and fluorenyl, which may themselves, in turn, be substituted. Substituents which may, in particular, be considered in this connection are alkyl or alkoxyl, and cycloalkyl or aryl, such as toloyl and methylfluorenyl. Phenyl is preferred.

$C_3$–$C_{18}$ cycloalkyl means any mono- or polycyclic cycloalkyl residues with 3 to 18 C atoms, such as cyclopropyl, cyclobutyl, cyclopentyl, cyclohexyl, cycloheptyl, cyclooctyl and further homologues, which may themselves, in turn, be substituted. Substituents which may, in particular, be considered in this connection are alkyl or alkoxy, and cycloalkyl or aryl, such as benzoyl, trimethylphenyl, ethylphenyl. Cyclohexyl and cyclopentyl are preferred.

The concentration of the organic nitro compound in the reaction medium is preferably in the range from 1 to 15,000 ppm, more preferably in the range from 5 to 500 ppm. The ratio of nitro compound to vanadium is preferably of the order of 1000:1, more preferably of the order of 100:1 and most preferably in the range from 10:1 to 1:1. The ratio of nitro compound to zirconium/hafnium is preferably of the order of 100:1, more preferably of the order of 25:1 and most preferably in the range from 14:1 to 1:1.

The monomers are generally polymerized cationically at temperatures in the range from −120° C. to +20° C., preferably in the range from −100° C. to −20° C., and pressures in the range from 0.1 to 4 bar.

Inert solvents or diluents known to the person skilled in the art for butyl polymerization may be considered as the solvents or diluents (reaction medium). These comprise alkanes, chloroalkanes, cycloalkanes or aromatics, which are frequently also mono- or polysubstituted with halogens. Hexane/chloroalkane mixtures, methyl chloride, dichloromethane or the mixtures thereof may be mentioned in particular. Chloroalkanes are preferably used in the process according to the present invention.

Suitable vanadium compounds are known to the person skilled in the art from EP-A1-818 476 which is incorporated by reference herein. Vanadium chloride is preferably used. This may advantageously be used in the form of a solution in an anhydrous and oxygen-free alkane or chloro-alkane or a mixture of the two with a vanadium concentration of below 10 wt. %. It may be advantageous to store (age) the V solution at room temperature or below for a few minutes up to 1000 hours before it is used. It may be advantageous to perform this aging with exposure to light.

Suitable zirkonium halides and hafnium halides are disclosed in DE 100 42 118.0 which is incorporated by reference herein. Preferred are zirkonium dichloride, zirkonium trichloride, zirkonium tetrachloride, zirkonium oxidichloride, zirkonium tetrafluoride, zirkonium tetrabromide, and zirkonium tetraiodide, hafnium dichloride, hafnium trichloride, hafnium oxidichloride, hafnium tetrafluoride, hafnium tetrabromide, hafnium tetraiodide, and hafnium tetrachloride. Less suitable are in general zirkonium and/or hafnium halides with sterically demanding substituents, e.g. zirconocene dichloride or bis (methylcyclopentadienyle)zirconium dichchloride. Preferred is zirkonium tetrachloride.

Zirconium halides and hafnium halides are advantageously used as a solution in a water- and oxygen free alkane or chloroalkanes or a mixture thereof in the presence of the organic nitro compounds in a zirkonium/hafnium concentration below of 4 wt. %. It can be advantageous to store said solutions at room temperature or below for a period of several minutes up to 1000 hours (aging), before using them. It can be advantageous to store them under the influence of light.

Polymerization may be performed both continuously and discontinuously. In the case of continuous operation, the process is preferably performed with the following three feed streams:

I) solvent/diluent+isoolefin (preferably isobutene)

II) multiolefin (preferably diene, isoprene) (+organic nitro compound in case of vanadium catalysis)

III) catalyst (+organic nitro compound in case of zirconium/hafnium catalysis)

In the case of discontinuous operation, the process may, for example, be performed as follows:

The reactor, precooled to the reaction temperature, is charged with solvent or diluent, the monomers and, in case of vanadium catalysis, with the nitro compound. The initiator, in case of zirconium/hafnium catalysis together with the nitro compound, is then pumped in the form of a dilute solution in such a manner that the heat of polymerization may be dissipated without problem. The course of the reaction may be monitored by means of the evolution of heat.

All operations are performed under protective gas. Once polymerization is complete, the reaction is terminated with a phenolic antioxidant, such as, for example, 2,2'-methylenebis(4-methyl-6-tert.-butylphenol), dissolved in ethanol.

Using the process according to the present invention, it is possible to produce novel high molecular weight isoolefin copolymers having elevated double bond contents and simultaneously low gel contents. The double bond content is determined by proton resonance spectroscopy.

This process provides isoolefin copolymers with a comonomer content of greater than 2.5 mol %, a molecular weight $M_w$ of greater than 240 kg/mol and a gel content of less than 1.2 wt. %.

These copolymers are the starting material for the halogenation process.

Halogenated isoolefin rubber, especially butyl rubber, may be prepared using relatively facile ionic reactions by contacting the polymer, preferably dissolved in organic solvent, with a halogen source, e.g., molecular bromine or chlorine, and heating the mixture to a temperature ranging from about 20° C. to 90° C. for a period of time sufficient for the addition of free halogen in the reaction mixture onto the polymer backbone.

Another continuous method is the following: Cold butyl rubber slurry in chloroalkane (preferably methyl chloride) from the polymerization reactor is passed to an agitated solution in drum containing liquid hexane. Hot hexane vapors are introduced to flash overhead the alkyl chloride diluent and unreacted monomers. Dissolution of the fine slurry particles occurs rapidly. The resulting solution is stripped to remove traces of alkyl chloride and monomers, and brought to the desired concentration for halogenation by flash concentration. Hexane recovered from the flash concentration step is condensed and returned to the solution drum. In the halogenation process, butyl rubber in solution is contacted with chlorine or bromine in a series of high-intensity mixing stages. Hydrochloric or hydrobromic acid is generated during the halogenation step and must be neutralized. For a detailed description of the halogenation process, see U.S. Pat. Nos. 3,029,191 and 2,940,960, as well as U.S. Pat. No. 3,099,644 which describes a continuous chlorination process, EP-A1-0 803 518 or EP-A1-0 709 401.

Another process suitable in this invention is disclosed in EP-A1-0 803 518 in which an improved process for the bromination of a $C_4$–$C_6$ isoolefin-$C_4$–$C_6$ conjugated diolefin polymer which comprises preparing a solution of said polymer in a solvent, adding to said solution bromine and reacting said bromine with said polymer at a temperature of from 10° C. to 60° C. and separating the brominated isoolefin-conjugated diolefin polymer, the amount of bromine being from 0.30 to 1.0 moles per mole of conjugated diolefin in said polymer, characterized in that said solvent comprises an inert halogen-containing hydrocarbon, said halogen-containing hydrocarbon comprising a $C_2$ to $C_6$ paraffinic hydrocarbon or a halogenated aromatic hydrocarbon and that the solvent further contains up to 20 volume percent of water or up to 20 volume percent of an aqueous solution of an oxidizing agent that is soluble in water and suitable to oxidize the hydrogen bromide to bromine in the process substantially without oxidizing the polymeric chain is disclosed which is for U.S. patent practice also included by reference.

The skilled in the art will be aware of many more suitable halogenation processes but a further enumeration of suitable halogenation processes is not deemed helpful for further promoting the understanding of the present invention.

Preferably, the bromine content is in the range of from 4–30 wt. %, preferably 6–17, more preferably 6–12.5 and the chlorine content is preferably in the range of from 2–15 wt. %, more preferably 3–8, most preferably 3–6.

It is in the understanding of the skilled in the art that either bromine or chlorine or a mixture of both can be present.

The halogenated copolymers presented in this invention are ideally suitable for the production of moldings of all kinds, in particular tire components, very particularly "inner liners", and industrial rubber articles, such as bungs, damping elements, profiles, films, coatings. The polymers are used to this end in pure form or as a mixture with other rubbers, such as NR, BR, HNBR, NBR, SBR, EPDM or fluororubbers. The preparation of these compounds is known to the skilled in the art. In most cases, carbon black is added as filler and a sulfur based curing system is used. For the compounding and vulcanization, it is referred to Encyclopedia of Polymer Science and Engineering, Vol. 4, S. 66 et seq. (Compounding) and Vol. 17, S. 666 et seq. (Vulcanization).

The vulcanization of the compounds is usually effected at temperatures in the range of 100 to 200° C., preferably 130 to 180° C. (optionally under pressure in the range of 10 to 200 bar).

The following Examples are provided to illustrate the present invention:

EXAMPLES

Experimental Details

Gel contents were determined in toluene after a dissolution time of 24 hours at 30° C. with a sample concentration of 12.5 g/l. Insoluble fractions were separated by ultracentrifugation (1 hour at 20000 revolutions per minute and 25° C.).

The solution viscosity η of the soluble fractions was determined by Ubbelohde capillary viscosimetry in toluene at 30° C. The molecular mass $M_v$ was calculated according to the following formula: ln $(M_v)$=12,48+1,565* ln η.

GPC analysis was performed by a combination of four, 30 cm long columns from the company Polymer Laboratories (PL-Mixed A). The internal diameter of the columns was 0.75 cm). Injection volume was 100 µl. Elution with THF was performed at 0.8 ml/min. Detection was performed with a UV detector (260 nm) and a refractometer. Evaluation was performed using the Mark-Houwink relationship for polyisobutylene (dn/dc=0.114; α=0.6; K=0.05).

Mooney-Viscosity was measured at 125° C. with a total time of 8 minutes (ML 1+8 125° C.).

The concentrations of the monomers in the polymer and the "branching point"[1] were detected by NMR.

[1] J. L. White, T. D. Shaffer, C. J. Ruff, J. P. Cross: Macromolecules (1995) 28, 3290

Isobutene (Fa. Gerling+Holz, Deutschland, Qualität 2.8) was purified by purging through a column filled with sodium on aluminum oxide (Na-content 10%).

Isoprene (Fa. Acros, 99%) was purified by purging through a column filled with dried aluminum oxide, and distilled under argon over calcium hydride. The water content was 25 ppm.

Methyl chloride (Fa. Linde, Qualität 2.8) was purified by purging through a column filled with active carbon black and another column with Sicapent.

Methylene chloride (Fa. Merck, Qualität Zur Analyse ACS, ISO) was distilled under argon over phosphorous pentoxide.

Hexane was purified by distillation under argon over calcium hydride.

Nitromethane (Fa. Aldrich, 96%) was stirred for 2 hours over phosphorous pentoxide, during this stirring, argon was purged through the mixture. Then the nitromethane was distilled in vacuo (about 20 mbar).
Zirconium tetrachloride (>=98%) Fa. Fluka, D.
Vanadium tetrachloride (Fa. Aldrich) was filtered through a glass filter under an argon atmosphere prior to use.

Example 1

300 g (5.35 mole) of isobutene were initially introduced together with 700 g of methyl chloride and 27.4 g (0.4 mole) of isoprene at −90° C. under an argon atmosphere and with exclusion of light. 0.61 g (9.99 mmole) of nitromethane was added to the monomer solution before the beginning of the reaction. A solution of vanadium tetrachloride in hexane (concentration: 0.62 g of vanadium tetrachloride in 25 ml of n-hexane) was slowly added dropwise (duration of feed approx. 15–20 minutes) to this mixture until the reaction started (detectable by an increase in the temperature of the reaction solution).

After a reaction time of approx. 10–15 minutes, the exothermic reaction was terminated by adding a precooled solution of 1 g of 2,2'-methylenebis(4-methyl-6-tert.-butylphenol) (Vulkanox BKF from Bayer AG, Leverkusen) in 250 ml of ethanol. Once the liquid had been decanted off, the precipitated polymer was washed with 2.5 l of ethanol, rolled out into a thin sheet and dried for one day under a vacuum at 50° C.

8.4 gr. of polymer were isolated. The copolymer had an intrinsic viscosity of 1.28 dl/g, a gel content of 0.8 wt. %, an isoprene content of 4.7 mole %, a $M_n$ of 126 kg/mole, a $M_w$ of 412.1 kg/mole, and a swelling index in toluene at 25° C. of 59.8.

Example 2

Halogenation of Polymer of Example 1

100 g of the polymer of example 1 are cut into pieces of 0.5 * 0.5 * 0.5 cm and were swollen in a 2-l Glasflask in the dark for 12 hours at room temperature in 933 ml (615 g) of hexane (50% n-Hexane, 50% mixture of isomeres). Then the mixture was heated to 45° C. and stirred for 3 hours in the dark.

To this mixture, 20 ml of water were added. Under vigorous agitation at 45° C., a solution of 17 g of bromine (0.106 mol) in 411 ml (271 g) of hexane was added in the dark. After 30 seconds the reaction was stopped by addition of 187.5 ml of aqueous 1 N NaOH. The mixture was stirred vigorously for 10 minutes. The yellow color of the mixture faded and turned into a milky white color.

After separation of the aqueous phase, the mixture was washed 3 times with 500 ml of distilled water. The mixture was then poured into boiling water and the rubber coagulated. The coagulate was dried at 105° C. on a rubber mill. As soon as the rubber was clear, 2 g of calcium stearate as stabilizer were added. (For analytical data see table 1). The nomenclature used in the microstuctural analysis is state of the art. However, it can also be found in CA-2,282,900 in FIG. 3 and throughout the whole specification.

TABLE 1

| | |
|---|---|
| Yield | 98% |
| Bromine content | 6.5% |
| Mikro structure acc. to NMR (in mole %) | |
| 1,4 Isoprene | 0.11 |
| 1,2 Isoprene | 0.11 |
| Exomethylene | 2.32 |
| Products of rearrangements | 0.59 |
| Conjugated double bonds in Endo-structure | 0.16 |
| Double bonds in Endo-structure | 0.11 |
| total | 3.40 |

Example 3

110.15 g (1.96 mole) of isobutene were initially introduced together with 700 g of methyl chloride and 14.85 g (0.22 mole) of isoprene at −95° C. under an argon atmosphere. A solution of 0.728 g (3.12 mmole) zirkonium tetrachloride and 2.495 g (40.87 mmole) of nitromethane in 25 ml of methylene chloride was slowly added, dropwise, within 30 minutes to this mixture.

After a reaction time of approx. 60 minutes, the exothermic reaction was terminated by adding a precooled solution of 1 g of Irganox 1010 (Ciba) in 250 ml of ethanol. Once the liquid had been decanted off, the precipitated polymer was washed with 2.5 l of acetone, rolled out into a thin sheet and dried for one day under a vacuum at 50° C.

47.3 g of polymer were isolated. The copolymer had an intrinsic viscosity of 1.418 dl/g, a gel content of 0.4 wt. %, an isoprene content of 5.7 mole %, a $M_n$ of 818.7 kg/mole, a $M_w$ of 2696 kg/mole, and a swelling index in toluene at 25° C. of 88.2.

Example 4

100 g of the polymer of Example 3 are cut into pieces of 0.5 * 0.5 * 0.5 cm and were swollen in a 2-l Glasflask in the dark for 12 hours at room temperature in 933 ml (615 g) of hexane (50% n-Hexane, 50% mixture of isomeres). Then the mixture was heated to 45° C. and stirred for 3 hours in the dark.

To this mixture, 20 ml of water were added. Under vigorous agitation at 45° C.; a solution of 17 g of bromine (0,106 mol) in 411 ml (271 g) of hexane was added in the dark. After 30 seconds, the reaction was stopped by addition of 187.5 ml of aqueous 1 N NaOH. The mixture was stirred vigorously for 10 minutes. The yellow color of the mixture faded and turned into a milky white color.

After separation of the aqueous phase the mixture was washed 1 time with 500 ml of distilled water. The mixture was then poured into boiling water and the rubber coagulated. The coagulate was dried at 105° C. on a rubber mill. As soon as the rubber was clear, 2 g of calcium stearate as stabilizer were added. (For analytical data see table 1). The nomenclature used in the microstuctural analysis is state of the art. However, it can also be found in CA-2,282,900 in FIG. 3 and throughout the whole specification.

TABLE 2

| | |
|---|---|
| Yield | 96% |
| Bromine content | 6.9% |

Example 5

Of the product of Example 2 a typical tire tube compound was prepared and vulcanized. As comparative example a comparable compound was prepared of POLYSAR Bromobutyl® 2030 available from Bayer Inc., Canada. The components are given in parts by weight.

TABLE 3

| Experiment | 5 a | 5 b |
|---|---|---|
| Product of Example 2 | | 100 |
| Bromobutyl ® 2030 | 100 | |
| Carbon Black N 660 | 60 | 60 |
| Sunpar 2280 | 7 | 7 |
| Pentalyn A | 4 | 4 |
| Stearic Acid | 1 | 1 |
| Zinc Oxide | 3 | 3 |
| Sulfur | 0.5 | 0.5 |
| Vulkacit ® DM | 1.3 | 1.3 |

All compounds are mixed at 130° C., curatives were added on the mill at 50° C.

CURED PROPERTIES

TABLE 4

| | 5 a | 5 b |
|---|---|---|
| On Monsanto Rheometer MDR 2000 @ 165° C. | | |
| MIN in [dNm] | 1.5 | 1.0 |
| Ts1 in [min] | 2.1 | 0.7 |
| T50 in [min] | 2.9 | 0.9 |
| T90 in [min] | 5.8 | 5.6 |
| MH in [dNm] | 5.9 | 8.6 |

The better curing properties of the inventive compounds are already obvious from the above data. For further clarification these data are visualized in FIG. 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Halogenated, low-gel, high molecular weight isoolefin multiolefin copolymers comprising a multiolefin content of greater than 2.5 mol %, a molecular weight $M_w$ of greater than 240 kg/mol and a gel content of less than 1.2 wt. %.

2. A copolymer according to claim 1, wherein the copolymer is an isoolefin diene copolymer with optionally, further monomers copolymerized.

3. A copolymer according to claim 1, wherein the copolymer is a isoobutene isoprene copolymer with optionally, further monomers copolymerized.

4. A process for the preparation of a halogenated, low-gel, high molecular weight isoolefin multiolefin copolymers with a multiolefin content of greater than 2.5 mol %, a molecular weight $M_w$ of greater than 240 kg/mol and a gel content of less than 1.2 wt. %., characterized in that said halogenated copolymers are produced in a process comprising the following steps:

a) polymerizing at least one isoolefin, at least one multiolefin, and optionally, further monomers in presence of a catalyst and a organic nitro compound; and b) contacting the resulting copolymer under halogenation conditions with at least one halogenating agent.

5. A process according to claim 4, wherein said organic nitro compound is of the general formula (I)

$$R\text{—}NO_2 \qquad (I)$$

wherein R represents H, $C_1$–$C_{18}$ alkyl, $C_3$–$C_{18}$ cycloalkyl or $C_6$–$C_{24}$ cycloaryl.

6. A process according to claim 4, wherein the concentration of said organic nitro compound in the reaction medium is in the range from 1 to 1000 ppm.

7. A process according to claim 4, wherein said a catalyst/initiator is selected from the group consisting of vanadium compounds, zirconium halides, hafnium halides, mixtures of two or three thereof, and mixtures of one, two or three thereof with $AlCl_3$ and from $AlCl_3$ derivable catalyst systems, diethylaluminum chloride, ethylaluminum chloride, titanium tetrachloride, stannous tetrachloride, boron trifluoride, boron trichloride, or methylalumoxane.

8. A process according to claim 7, wherein said vanadium compound is $VCl_4$.

9. A process according to claim 4, wherein said halogenated polymer is an isoolefin diene copolymer with optional further monomers copolymerized or an isoobutene isoprene copolymer with optional further monomers copolymerized.

10. A vulcanized compound comprising a halogenated, low-gel, high molecular weight isoolefin multiolefin copolymers comprising a multiolefin content of greater than 2.5 mol %, a molecular weight $M_w$ of greater than 240 kg/mol and a gel content of less than 1.2 wt. %.

* * * * *